United States Patent [19]

Parlatore et al.

[11] Patent Number: 5,000,607
[45] Date of Patent: Mar. 19, 1991

[54] DEVICE FOR FIXING AN OBJECT TO A SUPPORT, AND OBJECT INCORPORATING AT LEAST ONE SUCH FIXING DEVICE

[75] Inventors: Roger Parlatore, Condat; Alain Leluc, Solignac; Robert Brousse, Meyssac, all of France

[73] Assignee: Legrand, Limoges, France

[21] Appl. No.: 514,432

[22] Filed: Apr. 25, 1990

[30] Foreign Application Priority Data

Apr. 28, 1989 [FR] France ................... 89 05707

[51] Int. Cl.⁵ .............................................. B65D 59/00
[52] U.S. Cl. ................... 403/12; 403/405.1; 403/288
[58] Field of Search ............... 403/405.1, 406.1, 407.1, 403/3, 4, 12, 288

[56] References Cited

U.S. PATENT DOCUMENTS 3,585,894 6/1971 Brown ........................ 403/288 X
4,199,072 4/1980 Jacks .

FOREIGN PATENT DOCUMENTS 7415756 5/1974 Fed. Rep. of Germany .
7608158 3/1976 Fed. Rep. of Germany .
3005825 9/1981 Fed. Rep. of Germany ... 443/405.1
2539828 1/1983 France .

Primary Examiner—Andrew V. Kundrat
Attorney, Agent, or Firm—Charles E. Brown; Charles A. Brown

[57] ABSTRACT

A device for fixing an object to a support comprises, in a plate forming part of the object, at least one hole for a fixing to pass through. A gasket is applied to the plate at the location of the hole, and a bearing washer is disposed between the gasket and a head of the fixing. An immobilizing device associated with the bearing washer opposes movement of the bearing washer parallel to the plate and to allow movement of the bearing washer perpendicular to the plate. A confinement device associated with the gasket prevents the gasket escaping from the space between the bearing washer and the plate.

21 Claims, 1 Drawing Sheet

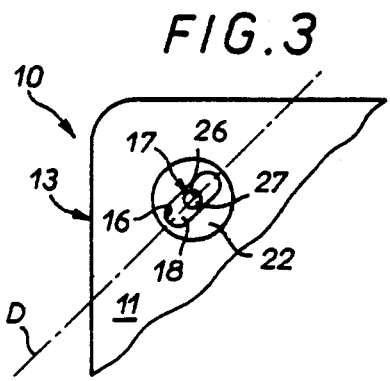
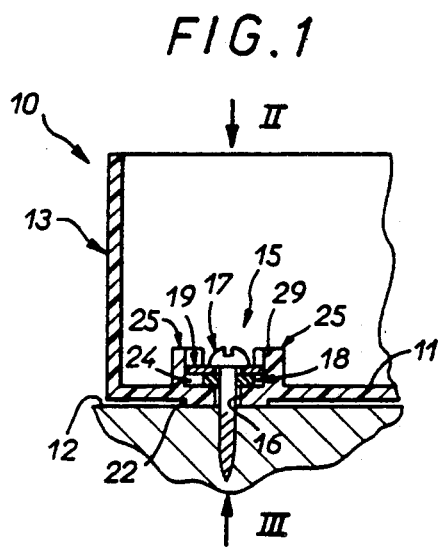
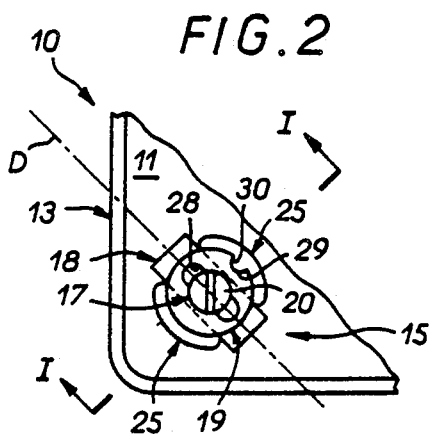
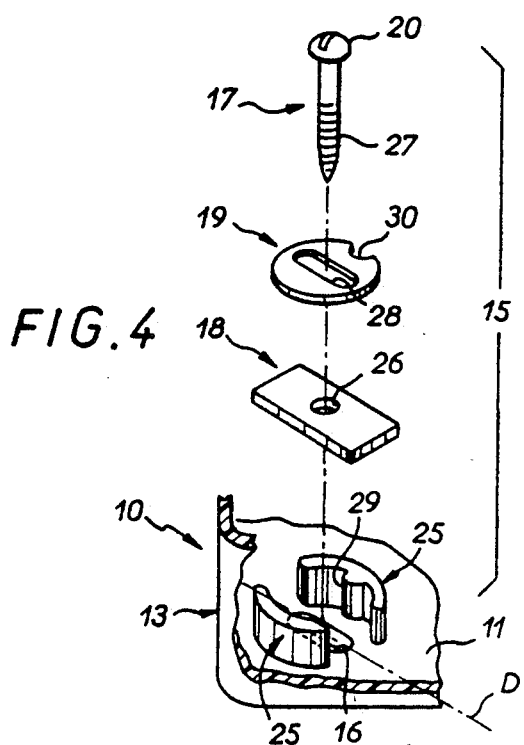
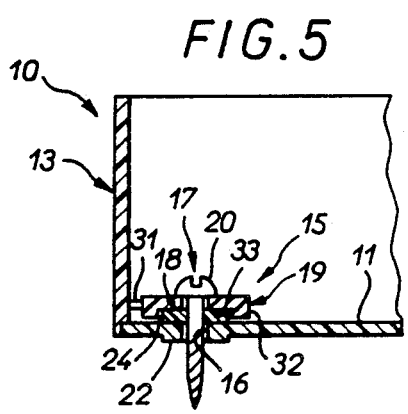
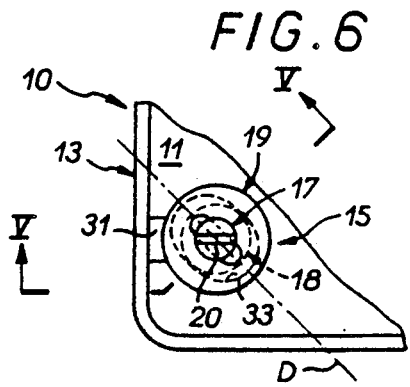

DEVICE FOR FIXING AN OBJECT TO A SUPPORT, AND OBJECT INCORPORATING AT LEAST ONE SUCH FIXING DEVICE

BACKGROUND OF THE INVENTION

1. Field of the Invention

The present invention is generally concerned with fixing any kind of object to any kind of support.

It is more particularly, but not necessarily exclusively, directed to the case where a box adapted to accommodate any kind of equipment, such as electrical equipment, for example, is to be attached to any kind of wall.

The present invention is even more particularly directed to the case where, in order to be attached to any kind of support, the object concerned, whether it is a box or any other kind of object, is equipped with at least one fixing device comprising (in the part adapted to be applied to the support to which it is to be attached, described hereinafter as constituting a plate, in practise the back of the box in the case of a box) at least one hole adapted to have passed through it any kind of fixing means, such as a screw, for example, and which may be either circular or in the form of a slot where it is necessary to provide for levelling when fitting.

The present invention is still more particularly directed to the case where the corresponding fixing must be fluid-tight to avoid possible ingress of moisture through the hole(s) employed.

2. Description of the Prior Art

To this end it has been proposed in some boxes to provide each of the holes at the bottom of a well extending the full height of the box and which, at the open side of the box, is closed off by the gasket usually provided between the box and the lid which closes it.

However, the provision of a well of this kind in a box of this kind inevitably reduces the space available inside the box, to the detriment of its capacity for accommodating equipment, and this disadvantage is all the worse if, as mentioned above, the holes in question are in the form of slots.

In other boxes the necessary seal is achieved by associating with each of the holes employed a gasket which is in contact with the corresponding plate at the hole and a bearing washer inserted between the gasket and the head of the corresponding fixing means.

This arrangement has the disadvantage of entailing the manipulation of additional parts at installation time, in this instance the gasket and the bearing washer. Because they are relatively small, they can easily be dropped (and in practise therefore lost), the corresponding manipulation being even more difficult in the case of boxes given that these operations must be carried out inside the box.

A general object of the present invention is an arrangement which can avoid these problems.

SUMMARY OF THE INVENTION

In one aspect, the present invention consists in a device for fixing an object to a support comprising, in a plate forming part of said object, at least one hole adapted to have fixing means passed through it, a gasket adapted to be applied to said plate at the location of said hole, a bearing washer adapted to be disposed between said gasket and a head of said fixing means, immobilizing means associated with said bearing washer adapted to oppose movement of said bearing washer parallel to said plate and to allow movement of said bearing washer perpendicular to said plate and confinement means associated with said gasket adapted to prevent said gasket escaping from the space between said bearing washer and said plate.

For example, the immobilizing means and the confinement means are conjointly constituted by at least two bosses in diametrally opposed positions and fastened to the plate. The gasket and the bearing washer are disposed between them, with the bearing washer force-fitted between the bosses.

Alternatively, the immobilization means comprise at least one tang joining the bearing washer to the object concerned and the confinement means are constituted by a retaining protrusion provided for this purpose on the lower surface of the bearing washer.

Be this as it may, the bearing washer of the fixing device in accordance with the invention is fitted in advance to the object concerned and locates the gasket relative to the object of its own accord.

Using this fixing device therefore requires no manipulation of the bearing washer or the gasket.

Furthermore, there is therefore normally no risk of the bearing washer or the gasket becoming inadvertently separated from the object to which they are fitted.

If the hole in the plate of the object is in the form of a slot, to allow for levelling, what has been said above still applies to the bearing washer and, during levelling, the bearing washer moves relative to the fixing means, with the object as a whole, whereas the gasket remains fixed in position, being clamped and sealed to the shank of the fixing means.

Finally, the fixing device in accordance with the invention is advantageously in a relatively compact form comparable with that of a conventional type fixing device with bearing washer and gasket, that is to say a bearing washer and gasket which are separate parts.

In another aspect, the present invention consists in an object, in particular a box, adapted to be attached to a support of any kind and equipped with at least one fixing device as hereinabove defined.

The objects, characteristics and advantages of the invention will emerge from the following description given by way of non-limiting example only with reference to the appended diagrammatic drawings.

BRIEF DESCRIPTION OF THE DRAWINGS

FIG. 1 is a partial view in transverse cross-section on the line I—I in FIG. 2 of a box equipped with a fixing device in accordance with the invention.

FIG. 2 is a partial plan view of this box as seen in the direction of the arrow II in FIG. 1.

FIG. 3 is a partial bottom view of it as seen in the direction of the arrow III in FIG. 1.

FIG. 4 is a partial perspective exploded view of it.

FIGS. 5 and 6 are views respectively analogous to those of FIGS. 1 and 2 for an alternative embodiment of the fixing device in accordance with the invention.

DETAILED DESCRIPTION OF THE INVENTION

The figures show by way of example the application of the invention to a box, more specifically a box body 10 with which a lid (not shown) is normally associated.

As the box body 10 does not of itself form any part of the invention it will not be described in complete detail here.

Suffice to say that it has a back 11 by means of which it is adapted to be applied to a support 12 to which it is to be attached and, extending annularly around the periphery of the back 11, a side wall 13, which may be perpendicular to the back, for example.

In the embodiment specifically shown in FIGS. 1 through 4 the side wall 13 is in one piece with the back 11 and in plan view the box has a rectangular contour with rounded corners.

At least one fixing device 15 is associated with the box body 10 to fix it to the support 12.

As shown here, by way of example, the fixing device 15 is disposed in one corner of the back 11.

It comprises, in the known manner, a hole 16 which is adapted to have passed through it any kind of fixing means 17 such as the screw shown here by way of example and, associated with the hole 16, a gasket 18 which is placed on the back 11 in line with the hole 16 and a bearing washer 19 which is inserted between the gasket 18 and the head 20 of the fixing means 17.

In the embodiment shown the hole 16 is in the form of a slot to allow for levelling and runs in a direction D, for example at 45° to the corresponding sides of the side wall 13.

The hole 16 is in an area 22 of the back 11 which has an increased thickness on the exterior side of the back 11.

In the known way, the box body 10 is made from a synthetic material, the gasket 18 is usually made from an elastic material and the bearing washer 19 is a metal washer, for example.

In accordance with the invention, and in ways to be described in more detail later, the bearing washer 19 is associated with immobilizing means adapted to oppose any significant displacement of the bearing washer 19 parallel to the back 11 but allowing movement perpendicular thereto. The gasket 18 is associated with confinement means adapted to prevent the gasket 18 escaping from the space 24 between the bearing washer 19 and the back 11.

In the embodiment shown in FIGS. 1 through 4 the immobilizing means and the confinement means are conjointly constituted by at least two bosses 25 in diametrally opposed positions on and fastened to the back 11. In practise they are in one piece with the back 11. Between them are disposed the gasket 18 and the bearing washer 19, with the bearing washer 19 force-fitted between the bosses 25.

In this practical embodiment only two bosses 25 are provided and they are symmetrical to each other, each running along one segment of a common circle.

The two bosses 25 are disposed on respective sides of the lengthwise dimension D of the hole 16 in the back 11.

The gasket 18 is in the form of a rectangular plate extending lengthwise between the bosses 25 and in contact with both the bosses at the sides. Each end extends outside the circle on which the bosses 25 lie.

The central hole 26 in it for the shank 27 of the fixing means 17 to pass through has a circular contour.

The central hole 28 in the bearing washer 19 for the shank 27 to pass through is in the form of a slot adapted to be aligned with the lengthwise dimension D of the hole 16 in the back 11.

Indexing means are preferably provided between the bearing washer 19 and at least one of the bosses 25.

As shown here, for example, these indexing means may comprise a rib 29 projecting from the inside surface of the boss 25 concerned, perpendicularly to the back 11 of the box body 10 and running the full height of the boss 25, and a notch 30 in the edge of the bearing washer 19 by means of which the bearing washer 19 is adapted to be interlocked with the rib 29.

The gasket 18 and the bearing washer 19 are factory-fitted between the bosses 25.

Because it is force-fitted between the bosses 25 the bearing washer 19 cannot normally escape from the bosses 25 and of its own accord retains the gasket 18.

Being indexed to one of the bosses 25, the bearing washer 19 cannot rotate between the bosses 25, so that its central hole 28 is certain to be aligned with the same direction D as the hole 16 in the back 11, being superposed on the latter.

Because of the bosses 25 the bearing washer 19 cannot move parallel to the back 11 either.

It is only able to move inwards and outwards, perpendicularly to the back 11, between the bosses 25.

The fixing means 17 may also be factory-fitted.

Alternatively, it may be fitted when the box body 10 concerned is installed.

Be this as it may, it is fitted by inserting its shank 27 through, in succession, the central hole 28 in the bearing washer 19, the central hole 26 in the gasket 18 and the hole 16 in the back 11.

Although the shank 27 passes with clearance through the central hole 28 in the bearing washer 19 and the hole 16 in the back 11, it passes without clearance through the central hole 26 in the gasket 18.

The gasket 18 is therefore resiliently clamped in a sealed manner to the shank 27.

Initially the fixing means 17 is inserted into the support 12 to only a limited degree, to allow the box body 10 to be moved relative to the fixing means 17 if levelling is necessary.

During such displacement the box body 10 entrains with it the bearing washer 19.

Being clamped to the shank 27 of the fixing means 17, the gasket 18 remains fixed in position.

In a second stage the fixing means 17 is driven fully home.

Due to the load applied by the head 20, the bearing washer 19 compresses the gasket 18 to bring about the necessary seal.

In the alternative embodiment shown in FIGS. 5 and 6 the immobilizing means associated with the bearing washer 19 are constituted by at least one tang 31 of reduced thickness linking the bearing washer 19 to the box body 10.

This tang 31 therefore joins the bearing washer 19 to the side wall 13 of the box body 10, being in one piece with the bearing washer 19 and with the side wall 13.

In practise this arrangement is obtained directly by the molding of the box and to facilitate such molding the side wall 13 is initially independent of the back 11, being attached to the latter afterwards, for example by ultrasonic welding.

In this embodiment, which differs in this respect from the previous embodiment, the bearing washer 19 is therefore made from synthetic material.

As previously the central hole 28 in it is in the form of a slot aligned with the lengthwise dimension D of the hole 16 in the back 11.

In this embodiment the confinement means associated with the gasket 18 are constituted by a retaining protrusion 32 provided for this purpose on the lower surface of the bearing washer 19.

In practise the retaining protrusion 32 also has a perimeter elongate in the lengthwise dimension D of the hole 16 in the back 11.

Here it is formed by the edge of a housing 33 recessed into the lower surface of the bearing washer 19 and in which at least part of the gasket 18 is accommodated.

The arrangements are such that, once fitted beneath the bearing washer 19, the gasket 18 cannot escape from the retaining protrusion 32 and therefore from the space 24 between the bearing washer 19 and the back 11.

As previously the bearing washer 19 is prevented from moving parallel to the back 11 by the tang 31 which joins it to the side wall 13.

However, because of the flexibility of the tang 31 it can move perpendicularly to the back 11.

This occurs when the fixing means 17 is driven fully into the support 12.

Of course, the present invention is not limited to the embodiments described and shown but encompasses any variant execution thereof and/or any variant combination of the various component parts thereof.

In particular, the bosses in the embodiment shown in FIGS. 1 through 4 could be joined to constitute a continuous member.

Furthermore, the field of application of the invention is not limited to that of boxes.

To the contrary, it encompasses the fixing of any kind of object to any kind of support where the corresponding fixing devices are operative on a plate of the object.

In the case of a box it is the back of the box which constitutes this plate.

We claim:

1. Device for fixing an object to a support comprising, in a plate forming part of said object, at least one hole adapted to have fixing means passed through it, a gasket adapted to be applied to said plate at the location of said hole, a bearing washer adapted to be disposed between said gasket and a head of said fixing means, immobilizing means associated with said bearing washer adapted to oppose movement of said bearing washer parallel to said plate and to allow movement of said bearing washer perpendicular to said plate and confinement means associated with said gasket adapted to prevent said gasket escaping from the space between said bearing washer and said plate.

2. Device according to claim 1 comprising at least two bosses constituting said immobilizing and confinement means and fastened to said plate in diametrally opposed positions, said gasket and said bearing washer being disposed between said bosses with said bearing washer force-fitted between said bosses.

3. Device according to claim 2 wherein at least said hole in said plate is a slot and said bosses are disposed on respective lengthwise sides of said slot and said bearing washer has a central slot adapted to be aligned with said slot in said plate.

4. Device according to claim 3 further comprising indexing means operative between said bearing washer and at least one of said bosses.

5. Device according to claim 2 wherein said bosses are disposed on respective segments of a common circle and are symmetrically disposed relative to each other.

6. Device according to claim 5 wherein said gasket is in the form of a plate extending lengthwise between said bosses and in contact with said bosses at its respective sides.

7. Device according to claim 1 wherein said immobilizing means comprise at least one tang joining said bearing washer to said object and said confinement means comprise a retainer protrusion on a lower surface of said bearing washer.

8. Device according to claim 7 wherein at least one hole in said plate is a slot, said protrusion has an elongate perimeter parallel to the lengthwise dimension of said slot in said plate and said bearing washer has a central slot parallel to said lengthwise dimension of said slot in said plate.

9. Device according to claim 7 comprising a housing recessed into a lower surface of said bearing washer and adapted to accommodate at least part of said gasket and wherein said protrusion is formed by the edge of said housing.

10. Object adapted to be attached to a support and comprising a plate and, in said plate, at least one fixing member comprising at least one hole adapted to have fixing means passed through it, a gasket adapted to be applied to said plate at the location of said hole, a bearing washer adapted to be disposed between said gasket and a head of said fixing means, immobilizing means associated with said bearing washer adapted to oppose movement of said bearing washer parallel to said plate and to allow movement of said bearing washer perpendicular to said plate and confinement means associated with said gasket adapted to prevent said gasket escaping from the space between said bearing washer and said plate.

11. Object according to claim 10 comprising at least two bosses constituting said immobilizing and confinement means and fastened to said plate in diametrally opposed positions, said gasket and said bearing washer being disposed between said bosses with said bearing washer force-fitted between said bosses.

12. Object according to claim 11 wherein at least said hole in said plate is a slot and said bosses are disposed on respective lengthwise sides of said slot and said bearing washer has a central slot adapted to be aligned with said slot in said plate.

13. Object according to claim 12 further comprising indexing means operative between said bearing washer and at least one of said bosses.

14. Object according to claim 11 wherein said bosses are disposed on respective segments of a common circle and are symmetrically disposed relative to each other.

15. Object according to claim 14 wherein said gasket is in the form of a plate extending lengthwise between said bosses and in contact with said bosses at its respective sides.

16. Object according to claim 10 wherein said immobilizing means comprise at least one tang joining said bearing washer to said object and said confinement means comprise a retainer protrusion on a lower surface of said bearing washer.

17. Object according to claim 16 wherein at least one hole in said plate is a slot, said protrusion has an elongate perimeter parallel to the lengthwise dimension of said slot in said plate and said bearing washer has a central slot parallel to said lengthwise dimension of said slot in said plate.

18. Object according to claim 16 comprising a housing recessed into a lower surface of said bearing washer and adapted to accommodate at least part of said gasket and wherein said protrusion is formed by the edge of said housing.

19. Object according to claim 10 in the form of a box of which said plate constitutes the bottom.

20. Object according to claim 19 wherein said immobilizing means comprise at least one tang joining said bearing washer to said object and said confinement means comprise a retainer protrusion on a lower surface of said bearing washer.

21. Object according to claim 20 wherein said box has a side wall manufactured independently of said plate constituting its bottom.

* * * * *